United States Patent [19]

Tsurushima et al.

[11] Patent Number: 4,519,058
[45] Date of Patent: May 21, 1985

[54] OPTICAL DISC PLAYER

[75] Inventors: Katsuaki Tsurushima, Kawasaki; Tsuneo Furuya, Tokyo; Tadashi Fukami, Koganei, all of Japan

[73] Assignee: Sony Corporation, Tokyo, Japan

[21] Appl. No.: 413,215

[22] Filed: Aug. 30, 1982

[30] Foreign Application Priority Data

Aug. 31, 1981 [JP] Japan .............................. 56-136844

[51] Int. Cl.³ .......................... H04N 5/76; G11B 7/00
[52] U.S. Cl. ...................................... 369/53; 369/54; 369/107; 369/124
[58] Field of Search ............... 358/340, 314, 336, 342; 360/38.1, 33.1; 369/53, 54, 107, 124

[56] References Cited

U.S. PATENT DOCUMENTS 4,308,557 12/1981 Dieterich ........................ 369/53 X
4,309,721 1/1982 Christopher .................... 369/53 X Primary Examiner—Robert L. Richardson
Attorney, Agent, or Firm—Hill, Van Santen, Steadman & Simpson

[57] ABSTRACT

An optical disc player comprises a rotating member for rotating the optical disc, an optical pickup member for reproducing a digital audio signal including an error correcting code such as the Reed-Solomon Code from the disc, an error correcting decoder for decoding the error correcting code so as to produce a corrected or interpolated digital audio signal and condition flag data indicating the correction of the digital audio signal, and a display for indicating the condition flag data as a stain or contamination condition of the disc.

5 Claims, 2 Drawing Figures

OPTICAL DISC PLAYER

BACKGROUND OF THE INVENTION

1. Field of the Invention

This invention relates generally to an optical disc player and more specifically to an optical disc player indicative of stains or obstructions on the disc.

2. Description of the Prior Art

In an optical disc player which reproduces an information data such as a video signal, a digital audio signal and so on from the optical disc by laser beam scanning, the disc is provided with a protective layer on the surface forming the information signal as pits or bumps. Since the information surface is brought into focus, relatively small amounts of dust, defects, or scars on the protective layer are out of focus of the laser beam so as not to influence the reproducing signal.

When there is, however, dust or scars that influence or obstruct large portions across the path of the laser beam on the protective layer, the reproducing signal is seriously damaged. If a digital audio signal is recorded on the disc, the drop out of the signal causes large noise in the reproduced sound.

OBJECTS AND SUMMARY OF THE INVENTION

Therefore, an object of this invention is to provide an optical disc player which indicates an obstruction such as dust or scars on the surface of the disc.

Another obejct of this invention is to provide an optical disc player which can be simply constructed.

A further object of this invention is to provide an optical disc player in which an error correcting code is employed to indicate the obstructions on the disc.

According to this invention, an optical disc player comprises a rotating member for rotating an optical disc with recorded information data thereon, an optical pickup member for obtaining the information data as optical information from the optical disc, a converting member for converting the optical information to an electric signal, a detecting circuit for detecting a condition of the electric signal so as to produce a detecting signal, and an indicating member for indicating condition of the electric signal as a condition of stain or contaminations on the disc.

The other objects, features and advantages of this invention will be apparent from the following description take in conjunction with the accompanying drawings.

DESCRIPTION OF THE PREFERRED EMBODIMENTS

Figure 1:
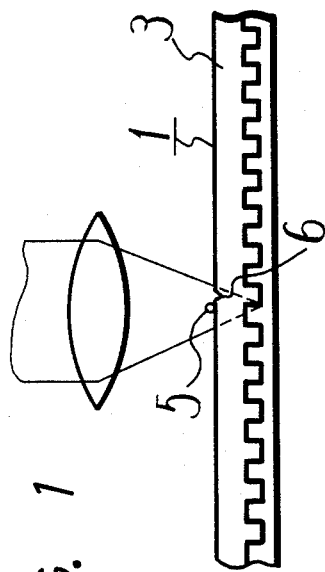
FIG. 1 is a schmatic diagram showing an optical disc player system for explaining this invention.

Referring now to FIG. 1 on an optical disc 1, which is recorded an information signal (by way of example, a digital signal including an error correcting code) has an information layer 2 constructed of a reflector and a protective layer 3 formed of transparent resin or the like and laminated on the information layer 2.

In an optical disc player system, the surface of the information layer 2 is scanned by laser beam 4, for instance, from which reflection a reproduced signal is obtained. Even when contamination such as dust 5 or a scar 6 is adhering to the surface of the protective layer 3, because out of focus, the reproduced signal is not influenced by the dust 5 or scar 6, if relatively small. Neverthless when the dust 5 or scar 6 is large enough to influence or obstruct a large portion across the path of the laser beam 4, the reproduced signal is seriously damaged.

Figure 2:
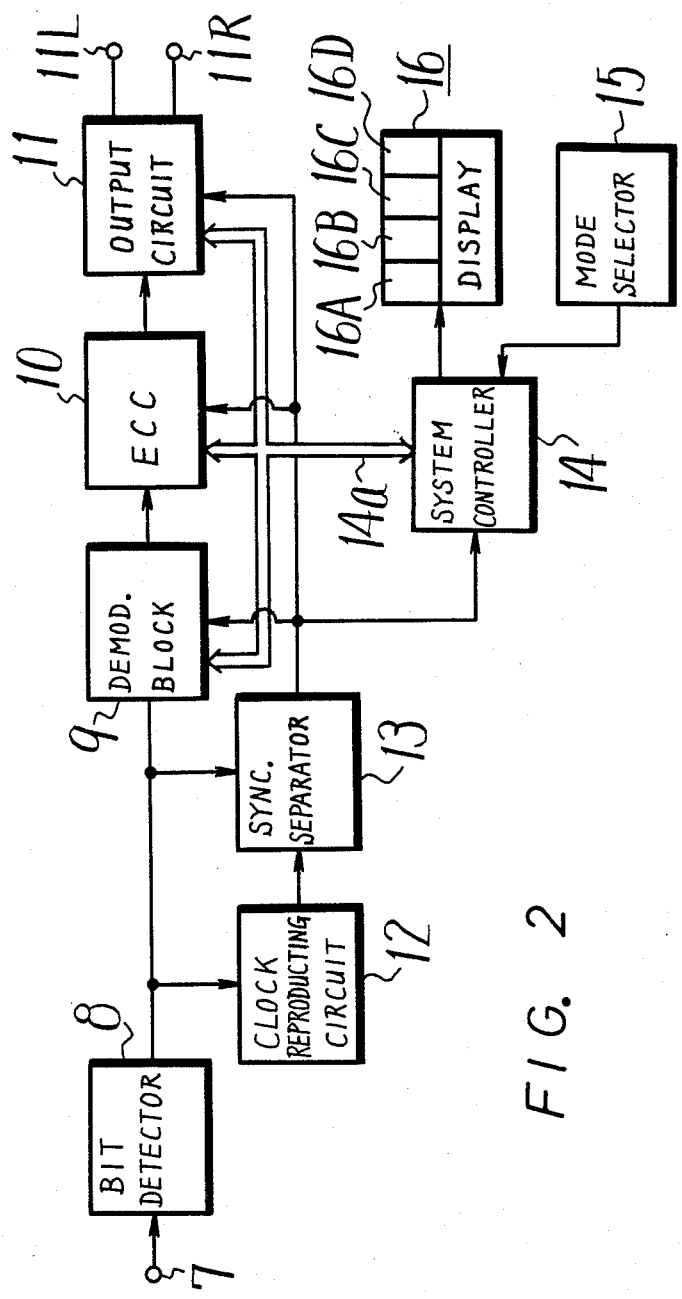
FIG. 2 is a schematic block diagram showing an embodiment of the optical disc player according to this invention.

Referring to FIG. 2, an optical disc player according to an embodiment of this invention is now described.

A reproduced electric signal, which is converted from an optical signal reproduced from the optical disc 1 by an optical pickup device (not shown), is supplied to an input terminal 7. The input signal is a digital information signal containing an error detecting and correcting code, for example a Cyclic Redundancy Correcting Code (CRCC) or Reed-Solomon Code, which is described in the Japanese Patent Application No. 67608/1980, now laid open patent publication No. 4629/1982 and corresponding in part to U.S. Pat. No. 4,413,340 derived from continuation-in-part of U.S. Ser. No. 265,465. The digital signal from the input 7 is supplied to a bit detection circuit 8 which includes a wave form shaping circuit and produces a bit information signal. The output signal from the bit detection circuit 8 is provided to a demodulation block 9 which converts the bit information signal to original binary data so as to be provided to an error detecting and correcting circuit 10.

The error detecting and correcting circuit 10 operates the binary data by the error detecting and correcting code in one error correcting block so as to produce the corrected data or the uncorrected data with an error pointer bit indicating that the data is bad and a 2 bit condition flag data indicating a result of a correcting operation in the error correcting block as follows:

(1) No error to be corrected. (2) One word corrected.

(3) Two words corrected. (4) Correction impossible. Detailed operation is disclosed in the Japanese Patent Applications No. 84424/1980, No. 84425/1980, No. 84426/1980, No. 84427/1980, No. 84428/1980, No. 99258/1980, No. 100814/1980 now in the laid open patent publications No. 10557/1982, No. 10558/1982, No. 10559/1982, No. 10560/1982, No. 10561/1982, No. 24143/1982, No. 25047/1982. The above-identified applications correspond to U.S. Ser. No. 613,761 filed May 24, 1984, a continuation of Ser. No. 275,328 filed June 19, 1981; U.S. Ser. No. 536,824 filed Sept. 28, 1983, a continuation of Ser. No. 283,924 filed July 16, 1981; and U.S. Ser. No. 579,003 filed Feb. 15, 1984, a continuation of Ser. No. 274,262, filed June 16, 1981, now an allowed application. The above U.S. pending cases correspond to published British Patent Application Nos. 2,079,993 published Jan. 27, 1982; 2,081,479 published Feb. 17, 1982; and 2,079,994 published Jan. 27, 1982.

At an output side of the error detecting and correcting circuit 10 is supplied the corrected data or interpolated data if the data was previously uncorrected. It is further provided to an output circuit 11 which includes, in the case of data which is a PCM stereo audio signal, a left and right signal separating circuit, a pair of digital to analog converting circuits, and a pair of low pass filters connected to left and right output terminals 11L and 11R, respectively.

The output signal from the bit detection circuit 8 is also supplied to a clock signal reproducing circuit 12 and a synchronizing signal detecting circuit 13. The clock signal reproducing circuit 12 extracts a bit clock signal from the reproduced bit information signal which is supplied to the synchronizing signal detecting circuit 13 in which various timing signals such as a synchronizing signal are generated. The various timing signals are supplied to the demodulation block 9, the error detecting and correcting circuit 10, and the output circuit 11 as a timing signal, respectively.

A system control circuit 14 generates control signals corresponding to various functions for example, PLAY, STOP, VOLUME CONTROL and so on selected by a mode selector 15 so as to control various circuits by the control signals through a bus line 14a.

In this embodiment, the error pointer bit or the 2-bit condition flag data from the error detecting and correcting circuit 10 is supplied through the system control circuit 14 to a display equipment 16 which indicates an obstruction condition across the laser beam such as dust 5 or a scar 6. The display equipment 16 has 4 light emitting devices 16A, 16B, 16C and 16D. The device 16A turns on so as to indicate a condition of excellent, when the condition flag data showing (1) No error to be corrected is derived. The device 16B turns on so as to indicate a normal condition when the condition flag data shows (2) One word corrected. The device 16C turns on so as to indicate a passable condition when the condition flag data shows (3) Two words corrected. The device 16D turns on so as to indicate that the disc 1 should be refreshed when the condition flag data shows (4) Correction impossible.

The other parts are constructed similar to a conventional optical disc player.

When there is dust 5 or a scar 6 on the optical disc 1 obstructing the laser beam 4, errors, a number of which correspond to a size of the obstructions, result in the reproduced signal supplied to the input terminal 7. Therefore the condition of the obstructions like the dust 5 or scar 6 on the optical disc 1 is known by means of the error correcting condition flag data. When the light emitting device 16D of the display 16 is turned on due to a stain or obstruction such as dust, it is possible to obtain a well reproduced signal by cleaning the surface of the disc 1 with a cleaning material or alcohol so it becomes good as new.

Although the four types of conditions are displayed in the above embodiment, it is also possible to provide only one light emitting device so as to indicate the condition (4) Correction impossible. In this case, the optical disc 1 must be always cleaned when the light emitting device is turned on.

The error pointer bit indicating bad or good is also employed as an error condition information. It will be apparent that many modifications and variations may be effected without departing from the scope of the novel concepts of this invention.

What is claimed is:

1. In an optical disc player for playing an optical disc having a digital data including an error detecting code thereon and wherein digital data is obtained and supplied to an error detecting and correcting circuit means for at least indicating whether or not digital words have been corrected, wherein the improvement comprises:
    indicating means responsive to the error detecting and correcting circuit means and for providing an indication to a user of the optical disc player of a measure of contamination of the optical disc being played.

2. An optical disc player according to claim 1 wherein the indicating means comprises an optical display which can be viewed by the user.

3. An optical disc player according to claim 1 wherein the error detecting and correcting circuit means detects four types of conditions of correction for a given block of data words, namely: no error, one word corrected, two words corrected, and correction impossible.

4. An optical disc player according to claim 3 wherein the indicating means is a visual display which displays an excellent condition corresponding to no errors, a normal condition corresponding to one word corrected, a passable condition corresponding to two words corrected, and a refreshing required condition corresponding to correction impossible.

5. An optical disc player according to claim 1 wherein the indicating means connects with a display means which visually displays at least whether the disc is usable or not usable corresponding to the error detecting and correcting circuit means outputs.

* * * * *